Oct. 14, 1958   A. OBERLE   2,855,941
PRESSURE-OIL REGULATING SYSTEM FOR POWER ENGINES
Filed Dec. 14, 1954   2 Sheets-Sheet 2
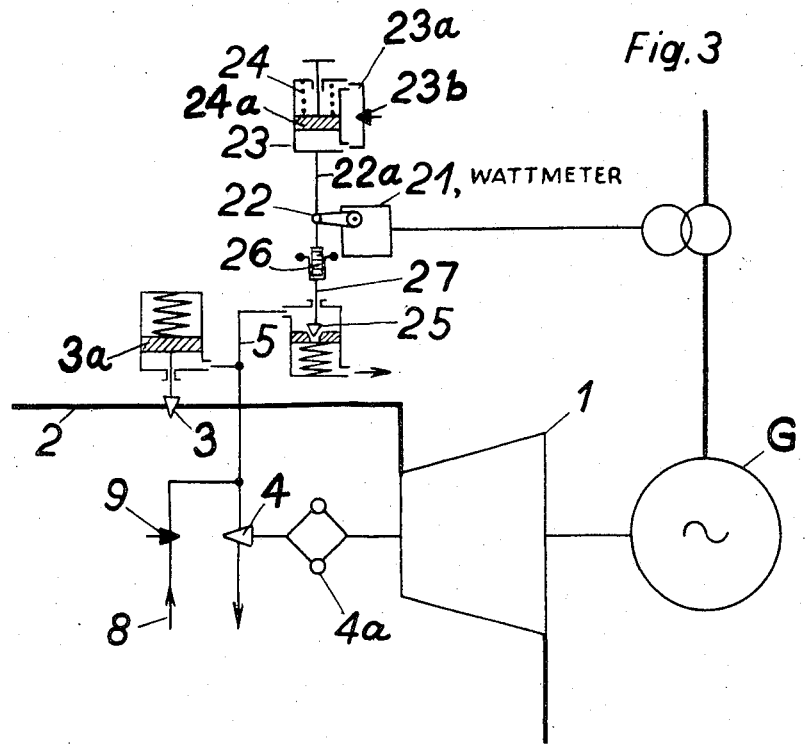
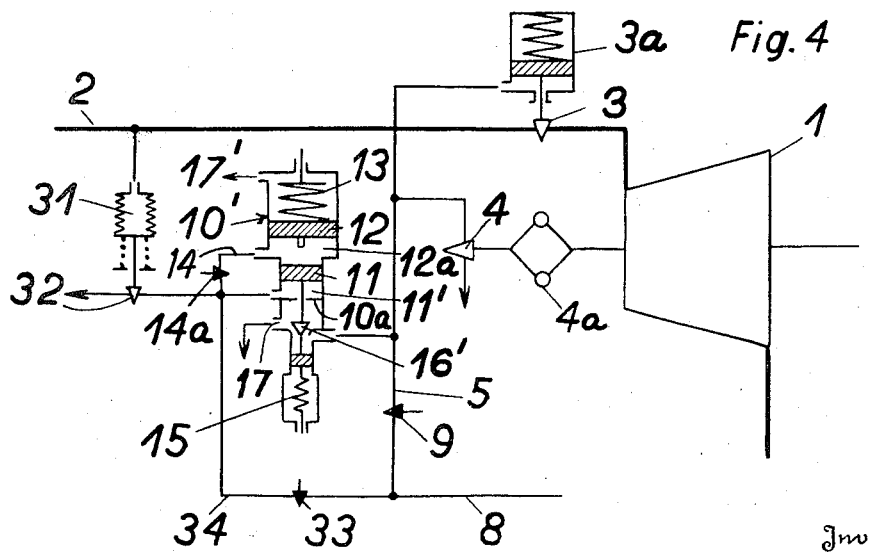
Inventor
Arthur Oberle,
By Pierce, Scheffler & Parker
Attorneys.

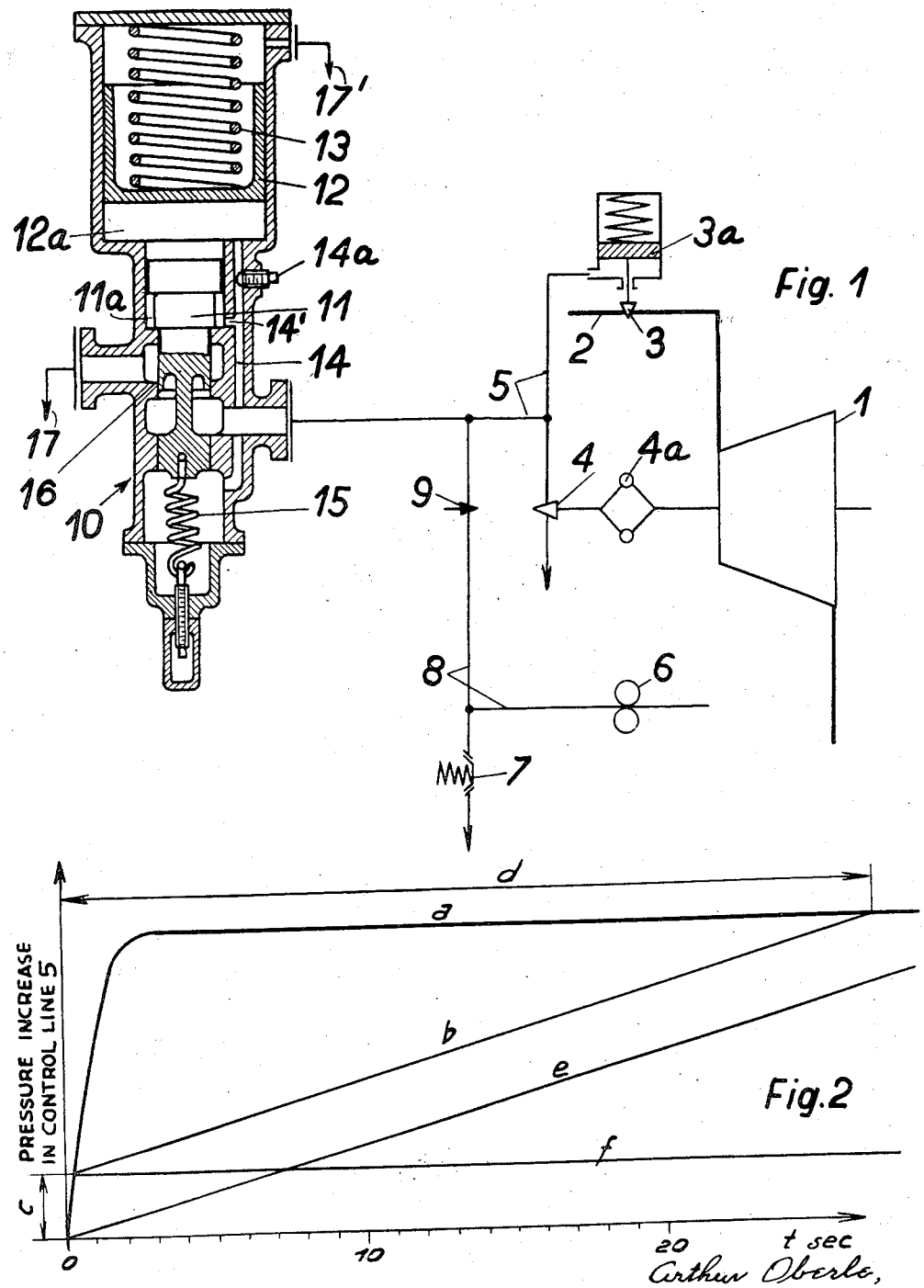

United States Patent Office 2,855,941
Patented Oct. 14, 1958

2,855,941

PRESSURE-OIL REGULATING SYSTEM FOR POWER ENGINES

Arthur Oberle, Wettingen, Switzerland, assignor to Aktiengesellschaft Brown, Boveri & Cie, Baden, Switzerland, a joint stock company Application December 14, 1954, Serial No. 475,144

Claims priority, application Switzerland December 18, 1953

5 Claims. (Cl. 137—36)

This invention relates to pressure-oil regulating systems for power engines such as steam turbines and particularly to regulating systems for engines supplied with steam by boilers of small storage capacity.

Modern steam plants usually have boilers of small storage capacity which may boil over when the boiler load varies by sudden and large demands for steam consumption. Prior attempts to cure this condition by boiler regulation and by so-called "aperture limiters" which limit the stroke of the inlet valve to the engine have not been entirely satisfactory. Such aperture limiters are subject to the disadvantage that they should be continuously readjusted in accordance with the instantaneous load and their effectiveness depends upon the watchfulness of the personnel. As an alternative, "live steam pressure limiters" have been proposed but such devices respond only after the boiler pressure has decreased a preselected amount but this method of control does not provide the required reliability since it is primarily the rapidity of pressure decrease and only secondarily the magnitude of the decrease that causes boiling over.

Objects of the present invention are to provide pressure-oil regulating systems for power engines which will automatically control the opening of the steam valve to the engine in such manner that sudden increases in the engine load are picked up so slowly that the supply boiler will not boil over. More specifically, an object is to provide a pressure-oil regulating system for a steam power engine of the type in which the power output is approximately proportional to the control oil pressure, the regulating system including a device for limiting the rate of load absorption in the case of sudden load increases by adjusting the control oil pressure to a value appropriate for the new load at the highest permissible rate appropriate for the associated steam generator.

These and other objects and the advantages of the invention will be apparent from the following specification when taken with the accompanying drawings in which:

Fig. 1 is a somewhat schematic diagram of a pressure-oil regulating system embodying the invention;

Fig. 2 is a pressure-time chart showing the variations of pressure in the regulating system with time in the event of a sudden load increase, and Figs. 3 and 4 are schematic diagrams of other embodiments of the invention.

In Fig. 1 of the drawings, the reference numeral 1 identifies a power engine, specifically a turbine, supplied with live steam through a conduit 2 having therein a valve 3 adjusted by a cylinder and piston 3a in accordance with the position of valve 4 in oil pressure line 5 as determined by the centrifugal governor 4a. A pump 6 delivers oil to line 8 from a source, not shown, under a pressure determined by relief valve 7, and the rate of oil flow from line 8 to control line 5 is adjustable by a throttle valve 9. In this and other views, valve 9 is shown schematically as a solid black triangle to indicate that it remains in fixed position during the operation of the regulating system whereas other valves, such as valves 3 and 4, are shown as open triangles to indicate that they are adjustable to effect the desired control.

In accordance with the invention, a pressure limiting valve 10 is connected to the control line 5 to prevent the pressure from quickly rising in that line in the event of a sudden load increase which results in a slowing down of the turbine 1 and a quick adjustment of valve 4 by the centrifugal governor 4a. Pressure oil from line 5 enters the casing of valve 10 and acts directly on the lower face of a piston 11 and also on the lower face of a buffer piston 12 which is loaded by a spring 13. The upper and somewhat enlarged end of piston 11 is movable in a chamber 11a which opens into chamber 12a of piston 12 which receives pressure oil through a small passage 14 provided with an adjustable throttle valve 14a and with a port 14' which opens into chamber 11a below the throttle valve 14a. Adjustable tension spring 15 normally retains piston 11 in position with its control edge 16 preventing the escape of pressure oil through the outlet 17. The upper end of chamber 12a is provided with an outlet 17' for air and any oil which leaks past the piston 12, thus allowing free movement of the piston in response to the force acting upon it.

When the turbine is running for an appreciable period under a constant load, the pressure in oil line 5 is constant and valve 3 is open to an extent determined by that load as reflected in the constant control oil pressure which also acts on both piston 11 and piston 12. Upon a sudden rise in the load, the turbine slows down and governor 4a effects a closing movement of valve 4 which increases the pressure in control line 5. The increased pressure acts immediately on piston 11 of valve 10 but the pressure in chamber 12a does not rise immediately in view of the throttling action of valve 14a in passage 14. Piston 11 thus rises quickly to permit escape of pressure oil through the outlet 17 and therefore the pressure in control line 5 can rise but slowly at a rate determined by the adjustment of the throttle valve 14a. The pressure within the chambers of valve 10 is continuously equal to the pressure in control line 5, and this pressure increases gradually through the flow of oil through passage 14 until piston 11 is lowered by spring 15 to interrupt the escape of oil through outlet 17. This gradual increase in pressure in the control line 5 effects a gradual opening of valve 3 and, when equilibrium is reached, the valve 3 is open to an extent appropriate for the new load.

In Fig. 2, the curve a shows the increase with time of the pressure which would take place in the control line 5 if the limiting valve 10 were not present, and curve b shows the gradual increase in pressure which takes place after a small quick rise, as indicated by curve c, when the limiting valve 10 is included in the regulating system. The extent of curce c is determined by the tensioning of the spring 15 and the inclination of the following curve portion b is determined by the adjustment of the throttle valve 14a. After a "running time" d, of about 27 seconds in the illustrated case, the control oil pressure rose to the same value which it would have attained in about 4 seconds if the limiting valve 10 were not present, and inlet valve 3 was automatically set at the appropriate value for the increased load at the end of this delay interval. The line or curve e shows the gradual increase of pressure in chamber 12a of the valve 10, and curve f is, for purpose of comparison, the pressure-time characteristic of a pressure-oil regulating system provided with a previously known "aperture limiter."

Another embodiment of the invention, as shown in Fig. 3, has the same characteristic mode of operation and includes various parts which may be the same as those previously described and which are identified by the same reference numerals. In this embodiment, a turbine 1 is supplied with live steam through conduit 2 and valve 3, and drives a current generator G whose load is measured by a wattmeter 21 which actuates a lever 22 with a force which is proportional to the measured load. Lever 22 is connected to a spindle 22a whose movements are damped by an oil brake comprising a cylinder 23 whose ends are connected by a passage 23a provided with a throttle valve 23b, and in which a spring 24 acts upon a piston 24a to oppose movement of spindle 22a in response to an increase in the generator output. Spindle 22a is connected to a valve 25 of pressure control line 5 and, according to known design and by appropriate means, the connection of spindle 22a to valve 25 is such that the position of valve 25 at any given load would establish a higher control oil pressure, by a differential corresponding to amount c of Fig. 2, than the pressure actually established in control line 5 by the setting of valve 4 by governor 4a when turbine 1 drives generator G to carry that particular load. This differential could be established by means, not shown, for adjusting the effective length of lever 22 or, as illustrated, by an adjustable connection 26 between spindle 22a and stem 27 of valve 25.

The described regulating system has the same operating characteristics as the previously described embodiment. Upon a surge increase in the load, the turbine slows down and governor 4a reduces the opening of the oil escape valve 4. The pressure at cylinder 3a of inlet valve 3 rises quickly to the pressure determined by the previous load adjustment of valve 25, i. e. along curve c of Fig. 2, and then rises gradually along curve b since wattmeter 21 and its lever 22 can follow the load increase only gradually in view of the oil brake.

The embodiment shown in Fig. 4 includes parts which are or may be identical with those of Fig. 1 and which are identified by the same numerals. In this form of the invention a bellows or other pressure responsive device 31 is connected to the live steam line 2 to adjust a regulating valve 32 in an auxiliary pressure oil system comprising a calibrated orifice or throttle valve 33 supplying pressure oil to line 34 from line 8. Within limits of about plus or minus 10%, pressure responsive device 31 and valve 32 maintain the oil pressure in line 34 proportional to the pressure of the live steam. The pressure limiting valve 10' which is connected to control line 34 is basically of the same construction as valve 10 of Fig. 1 but is here shown schematically as including a chamber 11' containing a piston 11 connected to a valve 16' which is normally maintained closed by spring 15, and with an external passage 14 provided with a throttle valve 14a, connecting line 34 to the chamber 12a of piston 12. The upper end of piston 11 is subject to the pressure in chamber 12a and chamber 11' is separated by a diaphragm 10a from the space controlled by valve 16' and which is connected to the control pipe 5.

In normal operation under slowly varying loads, valve 16' is closed and the pressure in control line 5 is varied through adjustment of valve 4 by the centrifugal governor 4a. Upon a sudden increase in the turbine load, the pressure in steam line 2 decreases and pressure responsive device 31 opens valve 32 to produce a pressure drop in control system 34. Piston 11 moves up immediately and opens valve 16' to vent pressure oil from line 5, thereby effecting a movement of valve 3 to throttle the supply of steam to the turbine and decrease the load on the steam generator. After an interval determined by the setting of throttle valve 14a, the oil pressures on opposite faces of piston 11 are equalized and valve 16' closes to return the regulation of the pressure in the control line 5 to the centrifugal governor and valve 4.

As in the other embodiment, this form of the invention effects a throttling of the steam withdrawn from the boiler when the rate of pressure decrease in the live steam line exceeds a preselected value.

I claim:

1. In a power plant, a steam-powered engine; a steam conduit for supplying steam to said engine; an inlet valve in said conduit having a piston in a cylinder and a spring in said cylinder biasing said piston to close said inlet valve; a pressure-oil control system including a pipe supplied with oil under constant pressure and connected to said cylinder to open said inlet valve; speed-responsive regulating means in said pressure-oil control system for adjusting said inlet valve to admit steam to said engine in an amount substantially proportional to the load of said engine, said regulating means including a first vent valve adjustable to regulate the escape of oil from said pipe thereby to control the pressure in said pipe; and limiting means in said pressure-oil control system for adjusting said inlet valve to throttle the rate of steam supply to said engine for a preselected interval of time to less than proportional for the instantaneous value of the load in the event of a sudden increase in the load, said limiting means comprising a second vent valve adjustable to regulate the escape of oil from said pipe thereby to control the pressure in said pipe, said second vent valve opening temporarily upon a sharp rise in the pressure within said pipe and including throttling means for delaying the rate of further pressure rise therein.

2. In a power plant, the invention as set forth in claim 1 wherein said second vent valve comprises a valve body having an inlet connected to said pipe and a vent outlet, a piston slidably movable in said valve body to control the opening of said vent outlet, spring means biasing said piston to close said vent outlet, means for adjusting the tension of said spring means so that the piston will move in a direction to open said vent outlet upon a sharp rise in pressure in the oil of said pipe, and throttling passage means in said valve body for gradually equalizing the pressure on both ends of said piston to enable said spring means to move the piston to reclose said vent outlet.

3. In a power plant, the invention as defined in claim 1 in combination with a generator driven by said engine, and wherein said limiting means includes a wattmeter measuring the output of said generator and lever means movable by said wattmeter for adjusting said second vent valve in accordance with the measured generator output.

4. In a power plant, the invention as defined in claim 3 wherein said throttling means is connected in said lever means.

5. In a power plant, the invention as defined in claim 1 wherein said limiting means further includes means responsive to the pressure in said steam conduit for actuating said second vent valve.

References Cited in the file of this patent

UNITED STATES PATENTS 2,731,022    Fischer _____ Jan. 17, 1956

FOREIGN PATENTS 87,633    Switzerland _____ Jan. 3, 1921